(12) United States Patent
Ryu (10) Patent No.: US 12,515,907 B2
(45) Date of Patent: Jan. 6, 2026

(54) TAPE FEEDING DEVICE

(71) Applicant: SK ON CO., LTD., Seoul (KR)

(72) Inventor: Jae Min Ryu, Daejeon (KR)

(73) Assignee: SK On Co., Ltd., Seoul (KR)

( * ) Notice: Subject to any disclaimer, the term of this patent is extended or adjusted under 35 U.S.C. 154(b) by 149 days.

(21) Appl. No.: 18/546,183

(22) PCT Filed: Sep. 13, 2022

(86) PCT No.: PCT/KR2022/013591
§ 371 (c)(1),
(2) Date: Aug. 11, 2023

(87) PCT Pub. No.: WO2023/038486
PCT Pub. Date: Mar. 16, 2023

(65) Prior Publication Data
US 2024/0116732 A1    Apr. 11, 2024

(30) Foreign Application Priority Data
Sep. 9, 2021 (KR) .................... 10-2021-0120231

(51) Int. Cl.
*B65H 20/16* (2006.01)
*B65H 20/18* (2006.01)
(Continued)

(52) U.S. Cl.
CPC ............. *B65H 20/16* (2013.01); *B65H 20/18* (2013.01); *B65H 20/20* (2013.01);
(Continued)

(58) Field of Classification Search
CPC   B65H 35/00; B65H 35/0006; B65H 35/0013; B65H 35/006; B65H 35/0073;
(Continued)

(56) References Cited

U.S. PATENT DOCUMENTS

| | | | | |
|---|---|---|---|---|
| 4,667,402 A | * | 5/1987 | Wilde | H01L 24/86 |
| | | | | 438/118 |
| 4,742,742 A | * | 5/1988 | Yokoe | B26D 7/32 |
| | | | | 83/101 |

(Continued)

FOREIGN PATENT DOCUMENTS

| | | | | |
|---|---|---|---|---|
| EP | 2829390 B1 | * | 4/2016 | ............. B31B 50/81 |
| JP | 2019-077545 A | | 5/2019 | |

(Continued)

OTHER PUBLICATIONS

International Search Report on the International Application No. PCT/KR2022/013591 issued by the International Searching Authority on Dec. 12, 2022.

*Primary Examiner* — Anna M Momper
*Assistant Examiner* — Raveen J Dias
(74) *Attorney, Agent, or Firm* — IP & T GROUP LLP (57) ABSTRACT

A tape supply device is disclosed. The tape supply device comprises a supply roll supplying a tape having a first surface and a second surface formed opposite to the first surface; and a clamp gripping an end of the tape drawn from the supply roll. The clamp includes a first fixing part movable in an up-down direction, the first fixing part positioned above the tape, the first fixing part facing the first surface; a second fixing part positioned below the first fixing part, the second fixing part positioned below the tape, the second fixing part facing the second surface, and the second fixing part movable in the up-down direction, the second fixing part including a through hole; and a push rod positioned below the second fixing part. When the second fixing part moves down, the push rod passes through the through hole and protrudes upward from the second fixing part.

20 Claims, 4 Drawing Sheets

(51) Int. Cl.
  *B65H 20/20* (2006.01)
  *B65H 35/00* (2006.01)
(52) U.S. Cl.
  CPC ..... *B65H 35/0013* (2013.01); *B65H 35/0066* (2013.01); *B65H 35/0086* (2013.01); *B65H 2301/415095* (2013.01); *B65H 2301/4433* (2013.01); *B65H 2301/44338* (2013.01); *B65H 2405/50* (2013.01); *B65H 2405/57* (2013.01); *B65H 2405/58* (2013.01); *B65H 2405/581* (2013.01); *B65H 2405/5831* (2013.01); *B65H 2405/60* (2013.01); *B65H 2701/377* (2013.01); *B65H 2801/72* (2013.01)
(58) Field of Classification Search
  CPC .. B65H 35/008; B65H 35/0086; B65H 35/04; B65H 35/06; B65H 20/00; B65H 20/16; B65H 20/18; B65H 20/20; B65H 20/22; B65H 29/00; B65H 29/003; B65H 29/02; B65H 29/045; B65H 29/047; B65H 29/048; B65H 2301/415095; B65H 2301/4433; B65H 2301/44338; B65H 2301/5152; B65H 2301/51538; B65H 2301/5154; B65H 2405/50; B65H 2405/57; B65H 2405/571; B65H 2405/572; B65H 2405/575; B65H 2405/58; B65H 2405/581; B65H 2405/5831; B65H 2405/60; B65H 2801/72; B65H 19/00; B65H 19/10; B65H 19/102; B65H 19/105; B65H 19/107; B65H 19/1826; B65H 19/1852; B65H 19/20; H01M 10/0409; H01M 10/0431; H01M 50/403; H01M 50/406; H01M 50/595
  See application file for complete search history.

(56) References Cited

U.S. PATENT DOCUMENTS

| | | | | |
|---|---|---|---|---|
| 4,848,691 | A * | 7/1989 | Muto | B65H 19/29 156/506 |
| 4,995,406 | A * | 2/1991 | da Silva | B65H 19/105 131/105 |
| 5,409,340 | A * | 4/1995 | Engert | B65H 35/006 412/19 |
| 5,589,029 | A * | 12/1996 | Matsui | H05K 13/0421 438/464 |
| 6,003,420 | A * | 12/1999 | Wakabayashi | B65H 35/006 83/687 |
| 6,201,306 | B1 * | 3/2001 | Kurosawa | H01L 21/67144 228/8 |
| 6,243,160 | B1 * | 6/2001 | Takano | B65H 20/18 250/548 |
| 6,943,094 | B2 * | 9/2005 | Koopmans | H01L 21/67132 438/464 |
| 7,624,498 | B2 * | 12/2009 | Ko | H01L 21/67092 29/721 |
| 8,801,352 | B2 * | 8/2014 | Webb | H01L 21/67132 414/811 |
| 2002/0069952 | A1 * | 6/2002 | Kurosawa | H01L 21/67132 156/286 |
| 2007/0128306 | A1 * | 6/2007 | Cheung | H01L 21/67132 425/444 |
| 2008/0202071 | A1 * | 8/2008 | Suolahti | B65B 11/045 53/580 |
| 2010/0126654 | A1 * | 5/2010 | Katayama | B65H 19/1852 156/380.8 |
| 2011/0036477 | A1 * | 2/2011 | Kato | B65H 35/0013 156/64 |
| 2012/0031549 | A1 * | 2/2012 | Malik, Jr. | B25J 13/086 156/361 |
| 2013/0074447 | A1 * | 3/2013 | Kim | H01L 21/6835 242/526 |
| 2015/0047788 | A1 * | 2/2015 | Kanda | B32B 43/006 156/767 |
| 2017/0137248 | A1 * | 5/2017 | Sato | B65H 19/102 |
| 2017/0341894 | A1 * | 11/2017 | Muller | B65H 19/107 |
| 2018/0162668 | A1 * | 6/2018 | Hong | B65H 19/102 |
| 2019/0270529 | A1 * | 9/2019 | Kawano | B65H 35/06 |
| 2022/0380157 | A1 * | 12/2022 | Kakinuma | H01L 21/67132 |
| 2023/0002183 | A1 * | 1/2023 | Kim | H01M 10/04 |
| 2023/0207962 | A1 * | 6/2023 | Yang | H01M 10/0404 429/94 |
| 2023/0286765 | A1 * | 9/2023 | Choi | H01M 10/0409 |
| 2024/0047763 | A1 * | 2/2024 | Lee | B65H 23/046 |
| 2024/0359941 | A1 * | 10/2024 | Ito | B65H 20/24 |
| 2025/0011120 | A1 * | 1/2025 | Ji | B65H 19/1852 |
| 2025/0125399 | A1 * | 4/2025 | Yang | H01M 10/0431 |

FOREIGN PATENT DOCUMENTS

| | | | | |
|---|---|---|---|---|
| KR | 10-2007-0057687 A | | 6/2007 | |
| KR | 10-2012-0080003 A | | 7/2012 | |
| KR | 10-2013-0128590 A | | 11/2013 | |
| KR | 10-1992658 B1 | | 6/2019 | |
| KR | 20200020148 A | * | 2/2020 | ............. B26D 5/20 |
| KR | 10-2111445 B1 | | 5/2020 | |
| KR | 10-2021-0006204 A | | 1/2021 | |
| KR | 10-2238802 B1 | | 4/2021 | |
| KR | 20230105795 A | * | 7/2023 | ............ B65H 35/00 |
| KR | 102738726 B1 | * | 12/2024 | ............ B65H 19/20 |
| WO | WO-2024210400 A1 | * | 10/2024 | ........... B65H 35/008 |

* cited by examiner

TAPE FEEDING DEVICE

CROSS-REFERENCE TO RELATED APPLICATIONS

This application is a national stage application of PCT/KR2022/013591 filed on Sep. 13, 2022, which claims the priority benefit of Korean Patent Application No. 10-2021-0120231 filed on Sep. 9, 2021, which is incorporated herein by reference for all purposes as if fully set forth herein.

TECHNICAL FIELD

The present disclosure relates to a tape supply device. More particularly, the present disclosure relates to a tape supply device capable of effectively cutting a tape used in a battery cell.

BACKGROUND ART

In general, a type of secondary batteries includes nickel cadmium batteries, nickel hydrogen batteries, lithium-ion batteries, lithium-ion polymer batteries, and the like. The secondary batteries are applied and used to large-sized products requiring high output such as electric vehicles and hybrid vehicles, power storage devices storing surplus generated power or renewable energy, and power storage devices for backup, as well as small-sized products such as digital cameras, P-DVD, MP3P, mobile phones, PDA, portable game devices, power pools, and E-bike.

The secondary batteries are classified into a pouch type and a can type according to a material of a case accommodating an electrode assembly. In the pouch type, an electrode assembly is accommodated in a pouch made of a soft polymer material. In the can type, an electrode assembly is accommodated in a case made of a material such as metal or plastic.

In general, a pouch, which is a case of a pouch-type secondary battery, is manufactured by drawing and molding a cup portion on a pouch film containing a soft material. In addition, an electrode assembly and an electrolyte are accommodated in an accommodation space provided in the cup portion, and a sealing portion is sealed. The electrode assembly is configured such that electrodes and separators are stacked. The electrode assembly includes an electrode tab protruding from one side of the electrode, and an electrode lead connected to the electrode tab to transmit electricity generated by the electrode to the outside. The electrode tab and the electrode lead are connected by welding, etc. to form a connection part.

However, after the welding, severe unevenness may be formed in the connection part, or a burr phenomenon may occur in which an end, i.e., a tip portion of the electrode tab does not completely adhere to the electrode lead and swells. When the tip portion of the electrode tab swells as described above, the swelling portion may damage the pouch accommodating the electrode assembly. The damage to the pouch may destroy the insulation of the pouch, degrading performance of the secondary battery and causing ignition or explosion of the secondary battery due to a short circuit.

In order to prevent this problem, an insulation tape is recently attached to the connection part between the electrode tab and the electrode lead using a tape supply device.

DISCLOSURE

Technical Problem

An object of the present disclosure is to address the above-described and other problems.

Another object of the present disclosure is to provide a tape supply device for gripping an adhesive tape and effectively separating the adhesive tape.

Another object of the present disclosure is to provide a tape supply device for efficiently cutting an adhesive tape.

An aspect of the present disclosure relates to a tape supply device for improving the convenience of supplying a tape by improving a tape fixing structure for cutting the tape.

Technical Solution

In order to achieve the above-described and other objects and needs, in one aspect of the present disclosure, there is provided a tape supply device comprising a supply roll configured to supply a tape having a first surface and a second surface formed opposite to the first surface; and a clamp configured to grip an end of the tape drawn from the supply roll, wherein the clamp includes a first fixing part movable in an up-down direction, the first fixing part positioned above the tape, the first fixing part facing the first surface; a second fixing part positioned below the first fixing part, the second fixing part positioned below the tape, the second fixing part facing the second surface, and the second fixing part movable in the up-down direction, the second fixing part including a through hole; and a push rod positioned below the second fixing part, wherein when the second fixing part moves down, the push rod passes through the through hole and protrudes upward from the second fixing part.

Advantageous Effects

Effects of a tape supply device according to the present disclosure are described as follows.

According to at least one aspect of the present disclosure, the present disclosure can provide a tape supply device for gripping an adhesive tape and effectively separating the adhesive tape.

According to at least one aspect of the present disclosure, the present disclosure can provide a tape supply device for efficiently cutting an adhesive tape.

Additional scope of applicability of the present disclosure will become apparent from the detailed description given blow. However, it should be understood that the detailed description and specific examples such as embodiments of the present disclosure are given merely by way of example, since various changes and modifications within the spirit and scope of the present disclosure will become apparent to those skilled in the art from the detailed description.

MODE FOR INVENTION

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

In the drawings, sizes of the components may be exaggerated or reduced for convenience of explanation. For example, the size and the thickness of each component illustrated in the drawings are arbitrarily illustrated for convenience of explanation, and thus the present disclosure is not limited thereto unless specified as such.

If any embodiment is implementable differently, a specific order of processes may be performed differently from the order described. For example, two consecutively described processes may be performed substantially at the same time, or performed in the order opposite to the described order.

In the following embodiments, when layers, areas, components, etc. are connected, the following embodiments include both the case where layers, areas, and components are directly connected, and the case where layers, areas, and components are indirectly connected to other layers, areas, and components intervening between them. For example, when layers, areas, components, etc. are electrically connected, the present disclosure includes both the case where layers, areas, and components are directly electrically connected, and the case where layers, areas, and components are indirectly electrically connected to other layers, areas, and components intervening between them.

Figure 1:
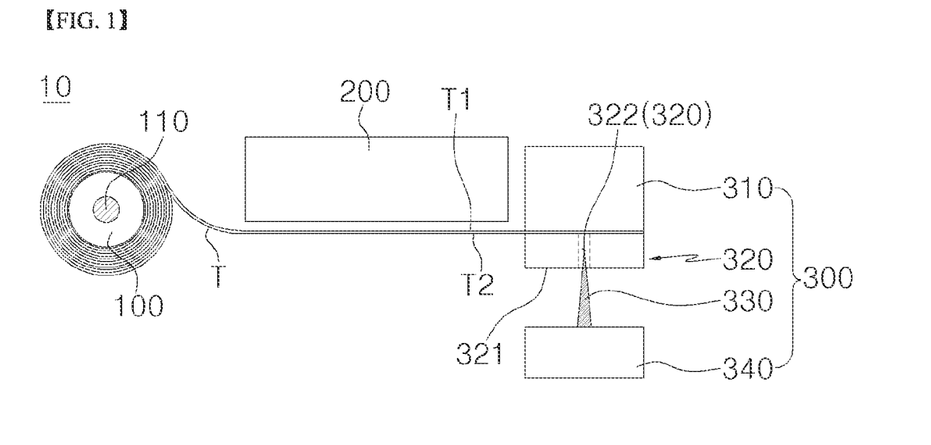
FIG. 1 illustrates a tape supply device according to an embodiment of the present disclosure.
Figure 2:
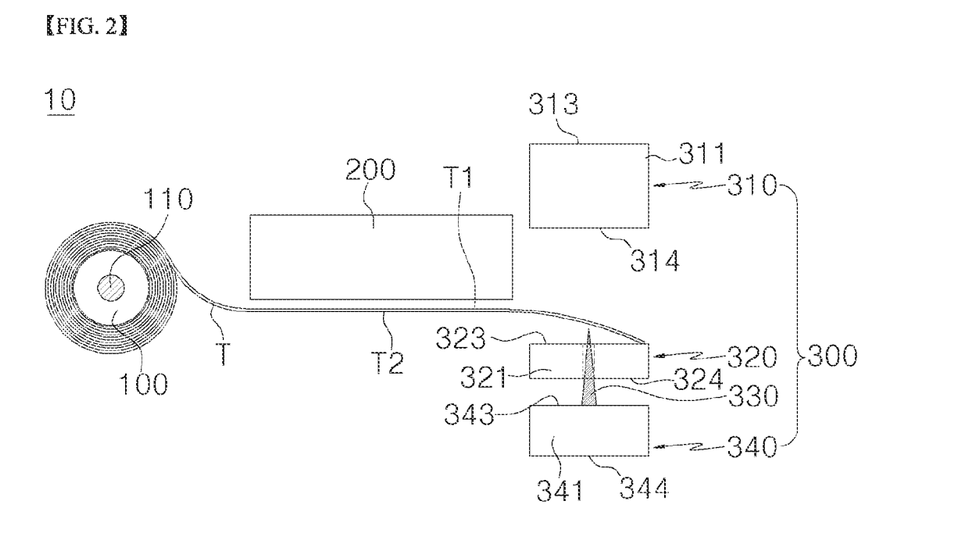
FIG. 2 illustrates that a second fixing part moves down in a tape supply device of FIG. 1.

FIG. 1 illustrates a tape supply device according to an embodiment of the present disclosure. FIG. 2 illustrates that a second fixing part moves down in the tape supply device of FIG. 1.

Referring to FIGS. 1 and 2, a tape supply device 10 may include a supply roll 100, a vacuum adhesion unit 200, and a clamp 300.

The supply roll 100 may continuously supply a rolled adhesive tape T. The supply roll 100 may mount the adhesive tape T. For example, the adhesive tape T in a rolled state may be mounted on the supply roll 100 and unwound while rotating. The adhesive tape T may be referred to as a "tape".

The supply roll 100 may be supported by a roll supporter 110. The roll supporter 110 may form a cylindrical shape. The roll supporter 110 may provide a rotation axis to the supply roll 100. In other words, the supply roll 100 may rotate using the hole supporter 110 as the rotation axis.

The tape T may have a first tape surface T1 and a second tape surface T2 that are opposite to each other. For example, the first tape surface T1 may be one surface of the tape T. For example, the second tape surface T2 may be other surface of the tape T. A direction from the first tape surface T1 to the second tape surface T2 may be parallel to a thickness direction of the tape T.

At least one of the first tape surface T1 and the second tape surface T2 may be an adhesive surface. For example, the first tape surface T1 may be a non-adhesive surface, and the second tape surface T2 may be an adhesive surface. The first tape surface T1 may be referred to as a "first surface". The second tape surface T2 may be referred to as a "second surface".

The adhesive surface may refer to a surface of the tape T to which an adhesive or a gluing agent is applied. For example, an adhesive or a gluing agent may be applied to the second tape surface T2. The non-adhesive surface may refer to a surface of the tape T to which no adhesive or gluing agent is applied. For example, no adhesive or gluing agent may be applied to the first tape surface T1.

The tape T may be attached to a battery cell. The tape T used in the battery cell may require insulation properties. For example, the tape T may be formed of a material including an insulation material.

The tape T may be made of polyethylene, polyacetylenes, polycarbonate, polyimide, polyethylene terephthalate, polypropylene, or a synthetic material thereof.

The vacuum adhesion unit 200 may be disposed on the tape T. The vacuum adhesion unit 200 may adhere to the tape T. For example, the vacuum adhesion unit 200 may adhere to the first tape surface T1. For example, the vacuum adhesion unit 200 may suck ambient air.

For example, the vacuum adhesion unit 200 may be connected to a vacuum pump (not shown) or include the vacuum pump. For example, the vacuum adhesion unit 200 may form at least one hole (not shown). Air positioned in a space between the first tape surface T1 and the vacuum adhesion unit 200 may be sucked through at least one hole included in the vacuum adhesion unit 200.

For example, the vacuum adhesion unit 200 may suck ambient air so that an air pressure between the first tape surface T1 and the vacuum adhesion unit 200 is lower than an ambient air pressure. Therefore, if the vacuum adhesion unit 200 does not suck air in a state where the first tape surface T1 is attached to the vacuum adhesion unit 200, the tape T may be separated from the vacuum adhesion unit 200 and may move down.

The clamp 300 may be positioned in front of the supply roll 100. In the present disclosure, a forward direction may be a direction from the supply roll 100 to the clamp 300. In the present disclosure, a rear direction may be a direction from the clamp 300 to the supply roll 100.

The clamp 300 may grip an end of the tape T drawn from the supply roll 100. The clamp 300 gripping the end of the tape T may move rearward. When the clamp 300 gripping the end of the tape T moves rearward, the tape T may be unwound from the supply roll 100. The vacuum adhesion unit 200 may be disposed between the clamp 300 and the supply roll 100.

The clamp 300 may include a first fixing part 310, a second fixing part 320, a support base 340, and a push rod 330.

An end of the drawn-out tape T may be fixed between the first fixing part 310 and the second fixing part 320. In other words, the first fixing part 310 and the second fixing part 320 may be coupled to the end of the tape T.

The first fixing part 310 and the second fixing part 320 may form shapes corresponding to each other. For example, each of the first fixing part 310 and the second fixing part 320 may have a plate shape. The first fixing part 310 and the second fixing part 320 may face each other. The second fixing part 320 may be positioned below the first fixing part 310.

In the present disclosure, a downward direction may be a direction from the first fixing part 310 to the second fixing part 320. In the present disclosure, an upward direction may be a direction from the second fixing part 320 to the first fixing part 310.

The first fixing part 310 may include a first fixing part body 311. The first fixing part body 311 may form a skeleton of the first fixing part 310. The first fixing part 310 may form upper and lower surfaces. For example, a first fixing part upper surface 313 may form the upper surface of the first fixing part 310. The first fixing part upper surface 313 may be formed at the first fixing part body 311. For example, a first fixing part lower surface 314 may form the lower surface of the first fixing part 310. The first fixing part lower surface 314 may be formed at the first fixing part body 311.

The first fixing part 310 may move in an up-down direction. The first fixing part 310 may move toward or away from the second fixing part 320. The first fixing part 310 may be positioned on the tape T. The first fixing part 310 may face the first tape surface T1 of the tape T. The first fixing part 310 may support the first tape surface T1.

The second fixing part 320 may be positioned below the tape T. The second fixing part 320 may face the second tape surface T2. The second fixing part 320 may support the second tape surface T2. The second fixing part 320 may move in the up-down direction. The second fixing part 320 may move toward or away from the first fixing part 310.

The second fixing part 320 may include a second fixing part body 321. The second fixing part body 321 may form a skeleton of the second fixing part 320. The second fixing part 320 may form upper and lower surfaces. For example, a second fixing part upper surface 323 may form the upper surface of the second fixing part 320. The second fixing part upper surface 323 may be formed at the second fixing part body 321. For example, a second fixing part lower surface 324 may form the lower surface of the second fixing part 320. The second fixing part lower surface 324 may be formed at the second fixing part body 321. The second fixing part upper surface 323 may face the first fixing part lower surface 314.

As illustrated in FIG. 1, the first fixing part 310 and the second fixing part 320 may fix the tape T. In other words, the tape T may be fixed to the first fixing part 310 and the second fixing part 320.

As illustrated in FIG. 2, the first fixing part 310 may move up, and the second fixing part 320 may move down. As above, when the first fixing part 310 moves up and the second fixing part 320 moves down, the tape T may be separated from the first fixing part 310 and the second fixing part 320.

The support base 340 may be positioned below the second fixing part 320. The position of the support base 340 may be fixed. For example, the position of the support base 340 with respect to the supply roll 100 may be fixed.

The support base 340 may include a support base body 341. The support base body 341 may form a skeleton of the support base 340. The support base 340 may form upper and lower surfaces. For example, a support base upper surface 343 may form the upper surface of the support base 340. The support base upper surface 343 may be formed at the support base body 341. For example, a support base lower surface 344 may form the lower surface of the support base 340. The support base lower surface 344 may be formed at the support base body 341. The support base upper surface 343 may face the second fixing part lower surface 324.

The push rod 330 may be coupled to, fixed to, or installed on the support base 340. For example, the push rod 330 may extend upward from the support base 340. The push rod 330 may have a rod shape. For example, the push rod 330 may have a decreasing cross section as it goes upward. In other words, an upper end of the push rod 330 may be pointed.

The second fixing part 320 may include a through hole 322. When the second fixing part 320 moves down, the push rod 330 may be inserted into the through hole 322 and may protrude upward from the second fixing part upper surface 323. In other words, when the second fixing part 320 moves down, the upper end of the push rod 330 may be positioned between the first fixing part 310 and the second fixing part 320.

The through hole 322 may form a shape extending in the up-down direction. For example, the through hole 322 may be connected to the second fixing part lower surface 324. For example, the through hole 322 may be connected to the second fixing part upper surface 323. In other words, the through hole 322 may extend upward from the second fixing part lower surface 324 and may be connected to the second fixing part upper surface 323.

When the push rod 330 protrudes upward from the second fixing part upper surface 323, the push rod 330 may push up the tape T. In this process, the coupling (or adhesion) between the tape T and the second fixing part 320 may be released. In other words, when the push rod 330 pushes up the tape T, the tape T may be separated from the second fixing part 320.

The process of separating the tape T from the second fixing part 320 will be described in detail. When the second fixing part 320 moves down, the push rod 330 may suppress the tape T from moving down. Hence, the tape T may be separated from the second fixing part 320.

The tape T may contact and be attached to the upper end of the push rod 330. An area of the upper end of the push rod 330 may be relatively small. Therefore, a coupling force between the push rod 330 and the tape T may be relatively small. That is, the push rod 330 can be easily separated from the tape T.

It is necessary to minimize a coupling force between the second fixing part 320 and the second tape surface T2. In order to minimize the coupling force between the second fixing part 320 and the second tape surface T2, the second fixing part upper surface 323 may be treated with coating. When the second fixing part upper surface 323 is treated with the coating, an adhesive force between the second tape surface T2 and the second fixing part upper surface 323 may be relatively small.

Herein, the "coating treatment" may mean coating (or applying) another material to the second fixing part upper surface 323. For example, a fluorocarbon resin (or fluorine resin) may be applied (or coated) to the second fixing part upper surface 323.

The fluorocarbon resin may be polytetrafluoroethylene (PTFE). The fluorocarbon resin (or fluorine resin) may refer to a material known as Teflon.

For another example, the second fixing part upper surface 323 may be coated with ceramic. For example, a ceramic powder may be coated (or applied) on the second fixing part upper surface 323.

The second fixing part upper surface 323 may form an uneven shape. The second fixing part upper surface 323 may form a concave-convex shape. For example, the second fixing part upper surface 323 may form the uneven shape through a thermal spray. After the uneven shape is formed on the second fixing part upper surface 323, the second fixing part upper surface 323 may be treated with the coating. Hence, the coupling force between the tape T and the second fixing part 320 may be relatively small.

The first fixing part lower surface 314 may be formed of a material including plastic. The first fixing part lower surface 314 may be formed of a material including urethane or polyurethane. For example, the first fixing part lower surface 314 may be formed by coating the lower surface of the first fixing part body 311 with urethane. The first fixing part lower surface 314 may be formed of a soft material.

While the first fixing part 310 and the second fixing part 320 grip the tape T, pressure may be concentrated on the unevenness formed on the second fixing part upper surface 323. The first fixing part lower surface 314 may absorb the pressure transmitted from the second fixing part upper surface 323. For example, the first fixing part lower surface 314 may transmit a uniform pressure to the second fixing part upper surface 323. As a result, an uneven structure formed on the second fixing part upper surface 323 can be easily maintained.

At least a portion of the surface of the push rod 330 is treated with coating. Herein, the "coating treatment" may mean coating (or applying) another material to at least a portion of the surface of the push rod 330. For example, a fluorocarbon resin or a ceramic powder may be applied (or coated) to the upper end of the push rod 330.

Figure 3:
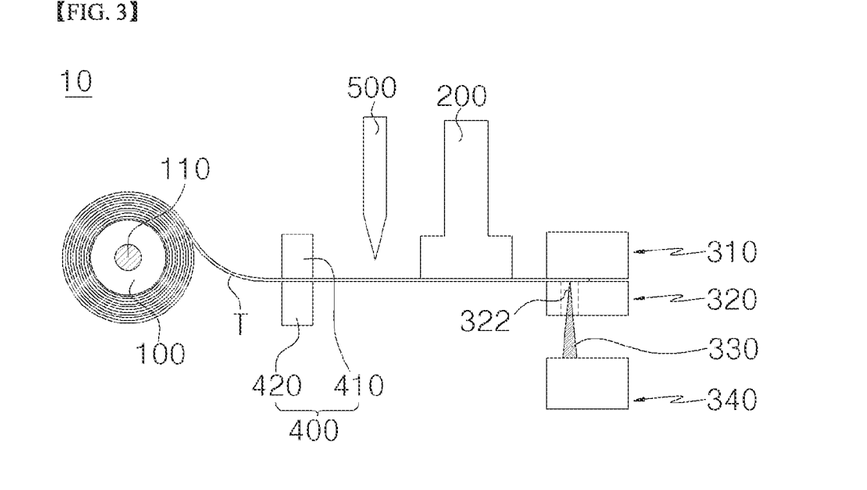
FIGS. 3 to 5 illustrate an operation of a tape supply device according to an embodiment of the present disclosure.
Figure 4:
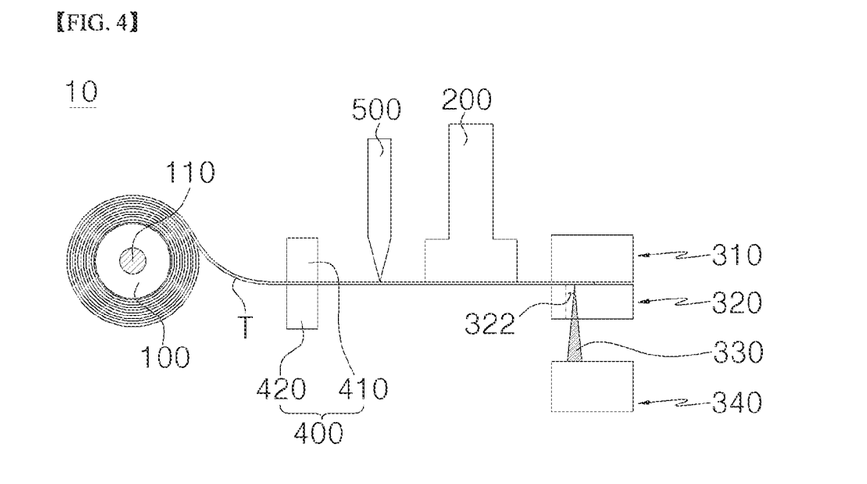
Figure 5:
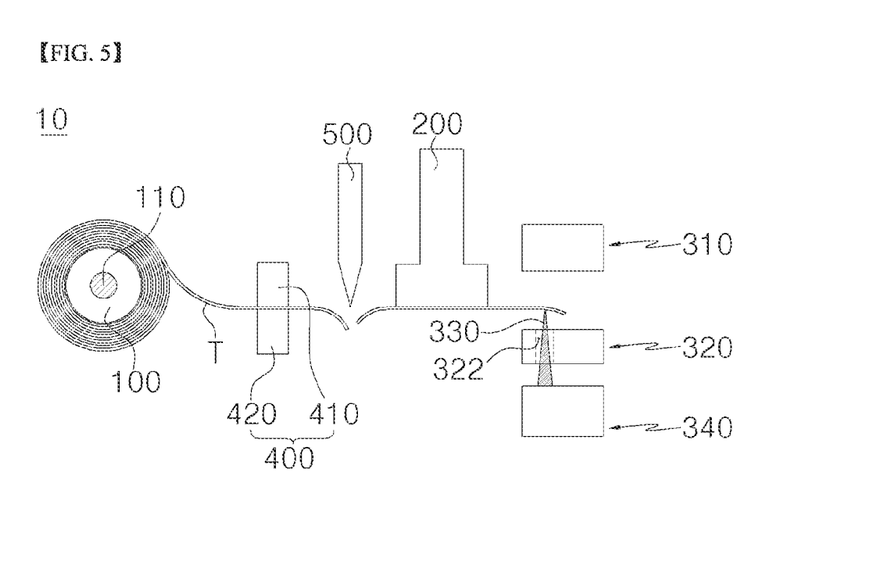

FIGS. 3 to 5 illustrate an operation of a tape supply device according to an embodiment of the present disclosure.

Referring to FIG. 3, the clamp 300 may grip the end of the tape T. The clamp 300 gripping the end of the tape T may move forward. The end of the tape T may be fixed between the first fixing part 310 and the second fixing part 320.

The tape supply device 10 may include a holder 400. The holder 400 may be disposed between the supply roll 100 and the clamp 300. For example, the holder 400 may be disposed between the supply roll 100 and the vacuum adhesion unit 200. The vacuum adhesion unit 200 may be positioned between the holder 400 and the clamp 300.

The holder 400 may include a first jig 410 and a second jig 420. The first jig 410 and the second jig 420 may face each other. The first jig 410 may be positioned on the second jig 420. The tape T may be transferred between the first jig 410 and the second jig 420.

The holder 400 may grip the tape T. For example, the first jig 410 and the second jig 420 may approach each other and grip the tape T. For example, when the first jig 410 and the second jig 420 move away from each other, the tape T may be separated from the holder 400.

The tape supply device 10 may include a cutting unit 500. The cutting unit 500 may be positioned between the holder 400 and the clamp 300. For example, the cutting unit 500 may be positioned between the holder 400 and the vacuum adhesion unit 200.

The cutting unit 500 may cut the tape T by applying pressure to the tape T. For example, an end of the cutting unit 500 may be pointed. The cutting unit 500 may be formed of a material including metal. For another example, the cutting unit 500 may be formed of a material including ceramic.

The cutting unit 500 may be positioned above or below the tape T. For example, the cutting unit 500 may be positioned above the tape T. The cutting unit 500 may move up and down. For example, the cutting unit 500 may move down and move toward the first tape surface T1, or may move up and move away from the first tape surface T1.

Referring to FIG. 4, the tape T may be gripped by the holder 400 and the clamp 300. The vacuum adhesion unit 200 may adhere to the tape T. The cutting unit 500 may approach the tape T and cut the tape T. For example, the cutting unit 500 may cut the tape T at a point between the holder 400 and the vacuum adhesion unit 200.

Referring to FIG. 5, after the cutting unit 500 cuts the tape T, the clamp 300 may be separated from the tape T. For example, when the first fixing part 310 moves up, the first fixing part 310 may be separated from the tape T. For example, when the second fixing part 320 moves down, the second fixing part 320 may be separated from the tape T. After the cutting unit 500 cuts the tape T, the cutting unit 500 may move up.

After the tape T is separated from the second fixing part 320, the separated tape T may maintain attached to the vacuum adhesion unit 200. The vacuum adhesion unit 200 may move toward an object, to which the tape T is to be attached, and attach the tape T to the object.

When the tape T is cut, the first fixing part 310 moves up, and the second fixing part 320 moves down. Hence, the push rod 330 passes through the through hole 322. As a result, the tape T cut by the cutting unit 500 is separated by the push rod 330.

The surface of the vacuum adhesion unit 200 may be treated. For example, poly tetra fluoro ethylene (PTFE) resin, perfluoro alkoxy (PFA) resin, fluorinated ethylene propylene copolymer (FEP) resin, or fluorine resin such as Teflon resin may be applied or coated on a lower surface of the vacuum adhesion unit 200. That is, the lower surface of the vacuum adhesion unit 200 may be treated with a non-adhesive surface.

The clamp 300 may move toward the holder 400. The clamp 300 approaching the holder 400 may grip the tape T. The clamp 300 gripping the tape T may move forward. When the clamp 300 gripping the tape T moves forward, the tape T may be unwound from the supply roll 100. Thereafter, the processes illustrated in FIGS. 3 to 5 may be repeated.

As illustrated in FIGS. 3 to 5, the cutting unit 500 may cut the tape T at an intermediate point between a center of the holder 400 and the lower surface of the vacuum adhesion unit 200. However, the present disclosure is not limited thereto. For example, the cutting unit 500 may cut the tape T at a point adjacent to the holder 400.

Figure 6:
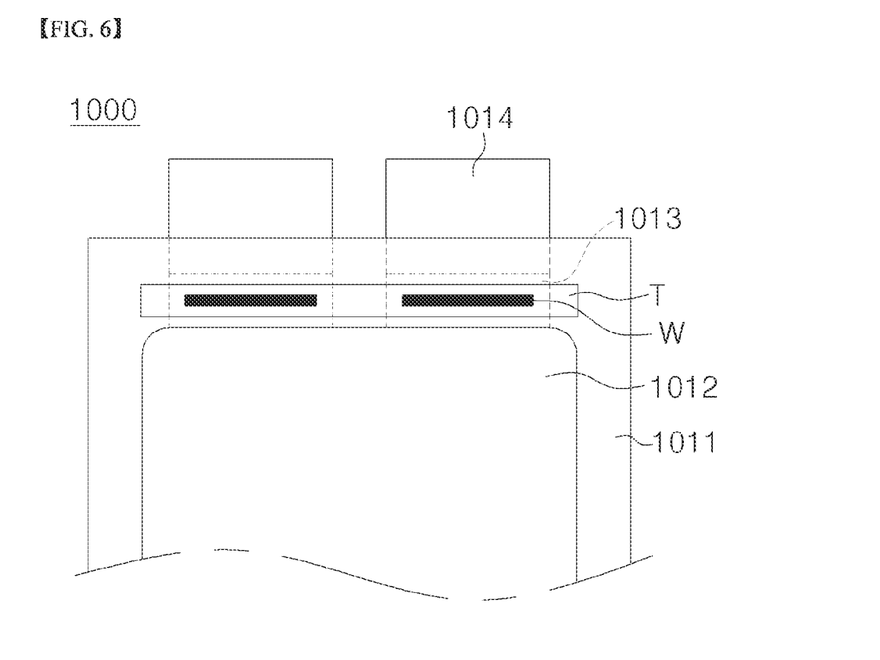
FIG. 6 illustrates that a tape is attached to an electrode assembly.

FIG. 6 illustrates that a tape is attached to an electrode assembly.

Referring to FIG. 6, a battery cell 1000 may include an electrode assembly 1012 and a case 1011. The case 1011 may include the electrode assembly 1012. For example, the case 1011 may be a pouch.

The battery cell 1000 may include an electrode tab 1013 and an electrode lead 1014. The electrode tab 1013 may extend from the electrode assembly 1012. The electrode tab 1013 may be accommodated in the case 1011. Each of the electrode tab 1013 and the electrode lead 1014 may be formed of a material including metal.

The electrode lead 1014 may be coupled to the electrode tab 1013. For example, one end of the electrode lead 1014 may be coupled to the electrode tab 1013. For example, the electrode lead 1014 may be coupled to the electrode tab 1013 through welding. A welded portion W may indicate a portion where the electrode lead 1014 and the electrode tab 1013 are overlapped and welded.

Other end of the electrode lead 1014 may be positioned outside the case 1011. The electrode lead 1014 may serve as an electrode terminal and be connected to an external device. For example, the external device is connected to the other end of the electrode lead 1014, and thus the battery cell 1000 may be charged and discharged.

The tape T may be attached to the welded portion W. For another example, the tape T may be attached to a portion of an inner surface of the case 1011 corresponding to the welded portion W. The tape T may cover the welded part W. The tape T may provide rigidity to the welded portion W. That is, even if an external impact is applied to the electrode lead 1014, the welded portion W can be suppressed from being cut.

The tape T may be attached to a top or a bottom of the welded portion W of the inner surface of the case 1011. Hence, even if the electrode tab 1013 has the unevenness or the electrode lead 1014 is separated from the electrode tab 1013, a damage to the case 1011 can be suppressed.

Figure 7:
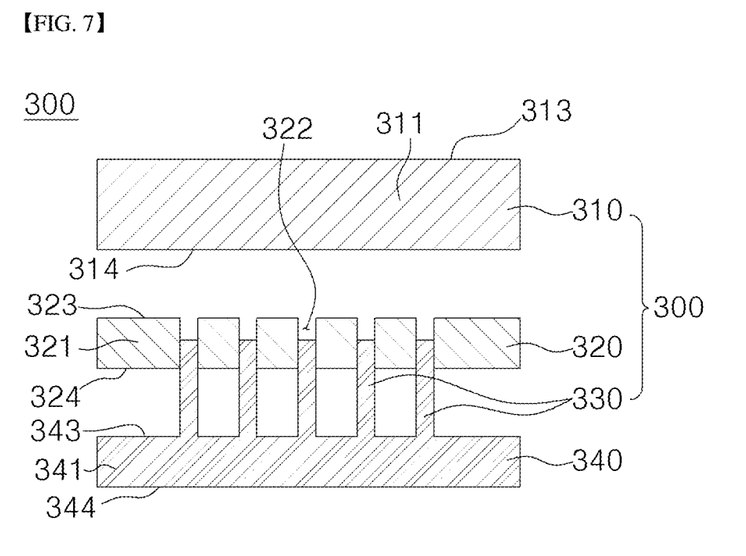
FIG. 7 illustrates a clamp including a plurality of push rods.

FIG. 7 illustrates a clamp including a plurality of push rods.

Referring to FIG. 7, a plurality of push rods 330 may be provided. The plurality of push rods 330 may form a shape extending upward from the support base 340. The plurality of push rods 330 may be spaced apart from each other. For example, the plurality of push rods 330 may be sequentially disposed in a front-rear direction.

A plurality of through holes 322 may be provided. The plurality of through holes 322 may be formed in the second fixing part body 321. The plurality of through holes 322 may correspond to positions of the plurality of push rods 330. For example, the number of push rods 330 may correspond to the number of through holes 322.

For example, each of the plurality of push rods 330 may be inserted into and pass through each of the plurality of through holes 322. Hence, the tape T (see FIG. 3) can be easily separated from the second fixing part 320.

Figure 8:
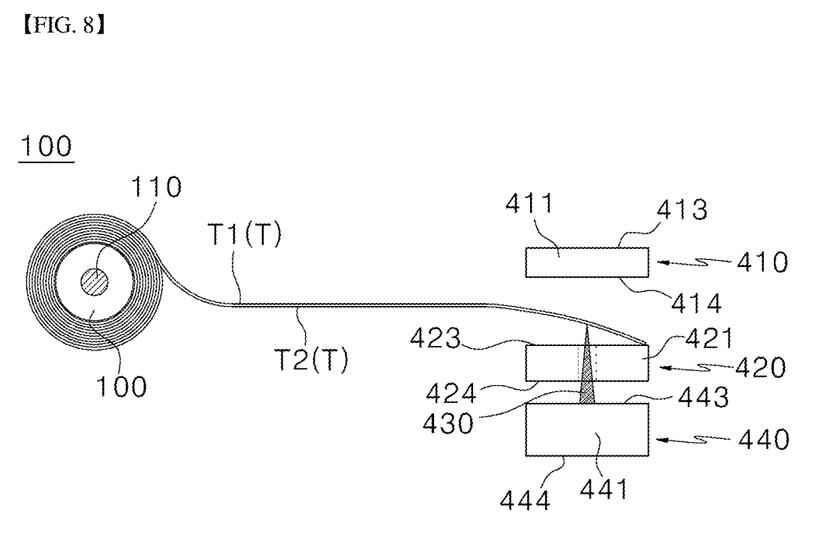
FIG. 8 illustrates a holder including a fixing pin.

FIG. 8 illustrates a holder including a fixing pin.

Referring to FIG. 8, the holder 400 may include the first jig 410, the second jig 420, a fixing pin 430, and a support plate 440. The tape T may be positioned between the first jig 410 and the second jig 420. The tape T may be supported by the first jig 410 and the second jig 420. The first jig 410 may be positioned on the tape T. The second jig 420 may be positioned below the tape T.

The first jig 410 may include a first jig body 411. The first jig body 411 may form a skeleton of the first jig 410. The first jig 410 may include a first jig upper surface 413. The first jig upper surface 413 may be formed at the first jig body 411 and form an upper surface of the first jig 410. A first jig lower surface 414 may be formed at the first jig body 411 and form a lower surface of the first jig 410. The first jig lower surface 414 may face the second jig 420.

The second jig 420 may include a second jig body 421. The second jig body 421 may form a skeleton of the second jig 420. The second jig 420 may include a second jig upper surface 423. The second jig upper surface 423 may be formed at the second jig body 421 and form an upper surface of the second jig 420. A second jig lower surface 424 may be formed at the second jig body 421 and form a lower surface of the second jig 420. The second jig lower surface 424 may face the support plate 440. The second jig upper surface 423 may face the first jig 410.

The support plate 440 may include a support plate body 441. The support plate body 441 may form a skeleton of the support plate 440. The support plate 440 may include a support plate upper surface 443. The support plate upper surface 443 may be formed at the support plate body 441 and form an upper surface of the support plate 440. A support plate lower surface 444 may be formed at the support plate body 441 and form a lower surface of the support plate 440. The support plate upper surface 443 may face the second jig 420.

The first jig 410 may face and support the first tape surface T1. The second jig 420 may face and support the second tape surface T2.

The second jig 420 may move in the up-down direction. The second jig 420 may include a jig through hole 422. The jig through hole 422 of the second jig 420 may form a shape extending in the up-down direction. For example, the jig through hole 422 of the second jig 420 may extend upward from the second jig lower surface 424 and may be connected to the second jig upper surface 423.

The jig through hole 422 may accommodate the fixing pin 430. After the cutting unit 500 (see FIG. 5) cuts the tape T and the clamp 300 (see FIG. 5) is separated from the cut tape T, the clamp 300 (see FIG. 5) may move toward the holder 400 and grip the tape T held on the holder 400.

Before the clamp 300 (see FIG. 5) gripping the tape T moves forward, the coupling between the tape T and the holder 400 needs to be released. The second jig 420 may move down. When the second jig 420 moves down, the fixing pin 430 may pass through the jig through hole 422 and protrude upward from the second jig upper surface 423. When the fixing pin 430 protrudes upward from the second jig upper surface 423, the descending of the tape T can be suppressed. That is, the tape T can be separated from the second jig 420.

An upper end of the fixing pin 430 may be pointed. A coupling force (or an adhesive force) between the fixing pin 430 and the tape T in a state where the fixing pin 430 and the tape T are coupled may be less than a coupling force (or an adhesive force) between the second jig 420 and the tape T in a state where the second jig 420 and the tape T are coupled. In other words, the tape T can be easily separated from the fixing pin 430.

Some embodiments or other embodiments of the present disclosure described above are not mutually exclusive or distinct from each other. Configurations or functions of some embodiments or other embodiments of the present disclosure described above can be used together or combined with each other.

It is apparent to those skilled in the art that the present disclosure can be embodied in other specific forms without departing from the spirit and essential features of the present disclosure. Accordingly, the above detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

The invention claimed is:

1. A tape supply device comprising:
a supply roll configured to supply a tape having a first surface and a second surface formed opposite to the first surface; and
a clamp configured to grip an end of the tape drawn from the supply roll,
wherein the clamp includes:
a first fixing part movable in an up-down direction, the first fixing part positioned above the tape, the first fixing part facing the first surface;
a second fixing part positioned below the first fixing part, the second fixing part positioned below the tape, the second fixing part facing the second surface, the second fixing part movable in the up-down direction, the second fixing part including a through hole; and
a push rod positioned below the second fixing part,
wherein when the second fixing part moves down, the push rod passes through the through hole and protrudes upward from the second fixing part.

2. The tape supply device of claim 1, wherein the first surface is a non-adhesive surface, and
wherein the second surface is an adhesive surface.

3. The tape supply device of claim 1, wherein the push rod extends in the up-down direction, and
wherein the push rod includes a pointed upper end.

4. The tape supply device of claim 3, wherein the clamp further includes a support base positioned below the second fixing part, and
wherein the push rod is fixed to the support base.

5. The tape supply device of claim 4, wherein the push rod extends upward from the support base.

6. The tape supply device of claim 1, wherein the push rod includes a plurality of push rods,
wherein the through hole includes a plurality of through holes, and
wherein each of the plurality of through holes correspond to each of the plurality of push rods.

7. The tape supply device of claim 1, wherein an upper surface of the second fixing part is treated with a coating.

8. The tape supply device of claim 7, wherein the upper surface of the second fixing part is applied with at least one of a fluorocarbon resin or a ceramic powder.

9. The tape supply device of claim 1, wherein an upper end of the push rod is treated with a coating.

10. The tape supply device of claim 9, wherein the upper end of the push rod is applied with at least one of a fluorocarbon resin or a ceramic powder.

11. The tape supply device of claim 1, further comprising:
a cutting unit that is movable toward or away from the tape and is configured to cut the tape.

12. The tape supply device of claim 11, wherein the first surface is a non-adhesive surface,
wherein the second surface is an adhesive surface, and
wherein the cutting unit is positioned above the first surface.

13. The tape supply device of claim 1, further comprising:
a holder positioned between the supply roll and the clamp,
wherein the holder is configured to grip the tape.

14. The tape supply device of claim 13, wherein the holder includes:
a first jig positioned above the tape and facing the first surface; and
a second jig positioned below the first jig of the tape and facing the second surface.

15. The tape supply device of claim 14, wherein the second jig is movable up and down.

16. The tape supply device of claim 15, wherein the second jig includes a jig through hole of a shape extending up and down,
wherein the holder includes a fixing pin disposed below the second jig, and
wherein when the second jig moves down, the fixing pin passes through the jig through hole and protrudes upward from the second jig.

17. The tape supply device of claim 13, further comprising:
a vacuum adhesion unit positioned between the holder and the clamp, facing the first surface, and configured to adhere to the tape.

18. The tape supply device of claim 1, wherein an upper surface of the second fixing part forms an uneven shape.

19. The tape supply device of claim 18, wherein a portion having the uneven shape in the upper surface of the second fixing part is applied with at least one of a fluorocarbon resin or a ceramic powder.

20. The tape supply device of claim 18, wherein a lower surface of the first fixing part includes urethane.

* * * * *